US008103382B2

(12) United States Patent
Root et al.

(10) Patent No.: US 8,103,382 B2
(45) Date of Patent: Jan. 24, 2012

(54) METHOD AND SYSTEM FOR SHARING INFORMATION THROUGH A MOBILE MULTIMEDIA PLATFORM

(75) Inventors: Timothy D. Root, Nashua, NH (US); Grinnell More, Nashua, NH (US)

(73) Assignee: North End Technologies

( * ) Notice: Subject to any disclaimer, the term of this patent is extended or adjusted under 35 U.S.C. 154(b) by 944 days.

(21) Appl. No.: 12/150,060

(22) Filed: Apr. 24, 2008

(65) Prior Publication Data

US 2009/0271812 A1    Oct. 29, 2009

(51) Int. Cl.
    *G06F 15/16*    (2006.01)
(52) U.S. Cl. .......................... 700/248; 709/204
(58) Field of Classification Search ................ 700/248; 726/3; 709/204, 205, 217, 218, 223, 226, 709/227, 229
See application file for complete search history.

(56) References Cited

U.S. PATENT DOCUMENTS

| 6,714,840 | B2 | 3/2004 | Sakaue et al. | |
| 7,069,308 | B2 * | 6/2006 | Abrams | 709/218 |
| 7,751,936 | B2 * | 7/2010 | Kim | 700/245 |
| 7,797,732 | B2 * | 9/2010 | Tam et al. | 726/3 |
| 2006/0161301 | A1 | 7/2006 | Kim | |
| 2006/0293787 | A1 | 12/2006 | Kanda et al. | |
| 2007/0150099 | A1 | 6/2007 | Lee | |
| 2007/0199108 | A1 | 8/2007 | Angle et al. | |

FOREIGN PATENT DOCUMENTS

WO    WO 02/073947 A3    9/2002

OTHER PUBLICATIONS iRobot Corp Web Site. [HTTP://WWW.IROBOT.COM] See attached ConnectT product description.

* cited by examiner

*Primary Examiner* — Dalena Tran
(74) *Attorney, Agent, or Firm* — Robert Schuler

(57) ABSTRACT

In a wide area communications network such as the Internet, a public server and an associated database store and make available to a private server personal information relating to an individuals emotional or some other mental or physical state. The private server includes functionality to interpret the personal information it receives or gathers from the public server in order to identify at least one reaction instruction which can be used by a multimedia communications device to convey to a user the state of an individual by generating a human perceivable reaction which can be playing multimedia content in combination with movement if the multimedia communications device is a robot.

24 Claims, 9 Drawing Sheets

PERSONAL WEB PAGE CONTENT 54

PERSONAL WEB PAGE FILE 53A

PICTURE OF INDIVIDUAL 54A

NAME OF INDIVIDUAL     54B

AGE OF INDIVIDUAL     54C

SEX OF INDIVIDUAL     54D

HEIGHT/WEIGHT     54E

OCCUPATION     54F

MARITAL STATUS     54G

PREFERENCES:     54H

RELATIONSHIP OBJECTIVE    54H1
      LIKES/DISLIKES    54H2
      FAVORITE SPORTS TEAM    54H3
      FAVORITE MUSIC    54H4
      FAVORITE ACTIVITIES    54H5
      OTHER

FIG. 5B

METHOD AND SYSTEM FOR SHARING INFORMATION THROUGH A MOBILE MULTIMEDIA PLATFORM

FIELD OF INVENTION

The invention relates generally to the field of robotic devices able to be connected to a communications network and specifically to the ability of the robotic device to gather information from the network and convey to an individual a human perceivable reaction.

BACKGROUND OF THE INVENTION

As the Internet is increasingly being utilized to facilitate inter-personal relationships, Internet services are available that allow individuals to create their own personal web sites or space. This personal web space is typically employed to publicly display an individuals "preferences" which can include such subjects as their relationship objectives, their likes and dislikes with respect to a wide variety of subjects and their interests to name only a few areas. The current model for interacting with such a personal web space is for one individual to access another individual's personal web space to initiate a dialog with another individual about whom the site relates and possibly become a "friend". Once a "friendly" relationship is established between two individuals, it is possible for these "friends" to give each other permission to access information stored in a "private preferences" portion of their personal Internet space. Such "private preference" information can include multimedia content, private feelings, wishes or hopes or other information that the individuals do not wish to be made public. This private preference information can be easily passed around over the Internet among "friends" so that these "friends" can experience in real time each others public and private preference information and then possibly reacting to this information by communicating in some manner with the "friend". This reactive communication can include an expression of sentiment towards a "friend" which can be among other things happiness or sadness, agreement or disagreement, appreciation, anger or joy. Typically, "friends" employ either computers or portable communication devices as the vehicle over which to enable this reactive communication.

In an effort to improve the quality, the ease and the enjoyment with which individuals conduct inter-personal relationships over a communications network; robotic devices are designed with the capability to support a communication session between at least two individuals. These robotic devices may be equipped with audio and video input and playback functionality that permits individuals who are both local and remote to the robotic device to be seen and heard by each other through the robot. A robotic device may also be equipped with environmental sensing capabilities that permit it to sense the presence of an individual proximate to it and the distance of the individual from the robotic device, for instance. One such robotic communications device is sold by the iRobot Corporation under the trade name of "ConnectR". This robotic communications device includes a duplex voice communication capability, a video camera for capturing images of the individual using the robotic device, local and remote control of the robotic devices movement and wireless communications technology for transmitting and receiving audio and video information over a communications network. Although the "ConnectR" robotic device does facilitate a communication session between individuals and does, under either local or remote control, move around its environment, this device is not able to gather and store any remote information, available on the network over which it communicates, to which it can react in a visible manner to an individual using the device.

Another robotic device suitable for facilitating interpersonal relationships is disclosed in US 2007/0199108 A1 entitled "Companion Robot for Personal Interaction". This application describes a robotic device with the capability to navigate from room to room in a house and to monitor the activity of and interact with individual residents in the house. Further, this application discloses a robotic device with the capability to connect to a communications network for the purpose of sending information it collects as the result of the monitoring activity in its local environment to a remote location. Conversely, a caregiver at the remote location is able to connect to the robotic device over the communications network for the purpose of monitoring the activity of a resident or for the purpose of sending specific questions concerning the welfare of a the resident over the connection to the robotic device that a resident can react to. The robotic device is also capable of receiving from the resident a response to questions that it can send over the communications network to the remote caregiver that is indicative of the welfare or condition of the resident. Although US publication no. 2007/0199108 does improve the quality of personal interaction between a remote caregiver and an individual that the caregiver is monitoring, the robotic device that is employed as a communication interface between the caregiver and the remotely monitored individual is only capable of reacting to information it gathers or senses from its local environment, such as the presence of the monitored individual. Although the robotic device can be remotely controlled to perform certain activities, the robotic device does is not able to "interpret" the instructions sent by the remote caregiver to generate a "reaction".

Numerous robotic devices exist that are able to gather information from their local environment and react to the information gathered in a particular manner. For instance, PCT publication WO 02/073947 A3 entitled "Robot for Remote Supervision and Remote Manipulation Via the Internet" discloses a robotic device that is able to detect the presence of an intruder in a residence and then react to this information by sending a message over the Internet to the owner of the residence that informs the owner of the intrusion into their home. US publication no. 2007/0150099 A1 entitled "Robot for Generating Multiple Emotions and Method of Generating Multiple Emotions in Robot" discloses a robotic device that is able to gather and store information from its local environment and then depending upon the type of information gathered from its external environment, is able to respond by generating one of a number of pre-programmed emotional behaviors. U.S. Pat. No. 6,714,840 entitled "User-Machine Interface System for Enhanced Interactions" discloses a robotic device that can detect and recognize an individual in its environment and generate an artificial feeling based on the individual it recognizes. US publication no. 2006/0293787 A1 entitled "Communication Robot Control System" discloses a robotic device with the ability to react to a person proximate to the robotic device by generating reactive motions and emotional interactive actions. Although the patents and applications described above disclose robotic devices that are capable of reacting to environmental stimulus, none of these robotic devices are able to gather information outside of their local environment and so have only limited utility for the development of inter-personal relationships.

US publication no. 2006/0161301 A1 entitled "Processing Method for Playing Multimedia Content Including Motion Control Information in Network-Based Robot System" discloses a robotic device capable of downloading multimedia content from a remote server over a communications network. The multimedia content may include information that the robotic device can use to generate certain motions based on the nature of the media content. Although the robotic device can "react" to the media content, it is merely reacting to motion instructions included in the downloaded multimedia file and in no way interpreting the content and then reacting by generating an appropriate motion.

None of the prior art robotic devices described previously are capable of facilitating a relationship between two or more individuals by allowing access to or the sharing of information stored at a personal web site associated with a communications network. Further, none of the prior art robotic devices are able to react in a human perceivable manner to information of any type gathered by the robotic device from a remote site over a communications network.

SUMMARY OF THE INVENTION

A novel method and system for gathering information relating to an individual that is available on a communications network such as the internet, for interpreting the information to identify a reaction instruction that can be used by an interactive multimedia communications device to convey a state of an individual by generating a human perceivable reaction.

In one embodiment of the invention, a method of using an interactive multimedia communications device to convey the state of an individual is comprised of a processing device connected to a communications network for receiving information relating to an individual, the processing device interpreting the received information to identify at least one reaction instruction, the processing device sending the at least one reaction instruction in a message to an interactive multimedia communications device which employs the at least one reaction instruction to convey the state of the individual by generating a human perceivable reaction.

In another embodiment of the invention, a method of using an interactive multimedia communications device to convey the state of an individual comprises receiving information relating to an individual at the interactive multimedia communications device connected to the communications network, the interactive multimedia communications device interpreting the received information to identify at least one reaction instruction, and the interactive multimedia communications device using the at least one reaction instruction to convey the state of the individual by generating a human perceivable reaction.

BRIEF DESCRIPTION OF THE DRAWINGS

FIG. 5B is an illustration of the content included on a personal web page.

DETAILED DESCRIPTION OF THE INVENTION

A novel method and system for gathering information relating to an individual over a communications network and then interpreting this information in a manner that results in the identification of reaction instructions that can be used by a mobile multimedia communications device to convey the state of an individual is described hereinafter. The state of an individual can include the emotional state of an individual, the physical state of an individual, state of the environment in which the individual resides, or any other state associated with or in proximity to an individual that can have an affect on the individual. The method and apparatus of my invention are described here in the context of a public, wide area communications network such as the Internet, but it can also be implemented on a private communications network or a local area network. In effect, the invention is not limited to use on any particular type of communication network.

Figure 1:
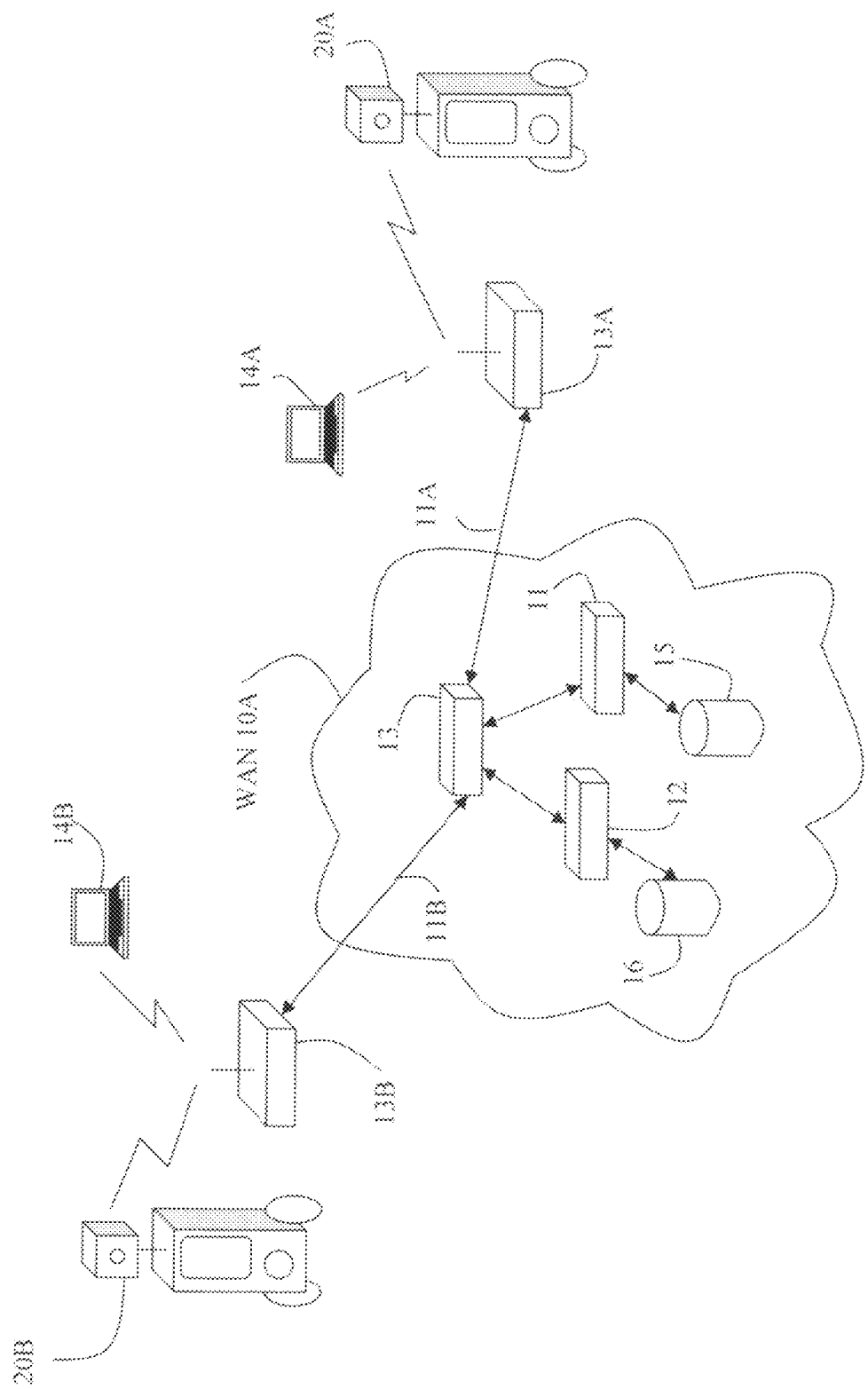
FIG. 1 is a diagram showing the elements of a communications network employed by the invention.

FIG. 1 is a diagram showing a wide area communication network (WAN) 10 that includes a plurality of routers collectively illustrated as router 13 for moving packets of information around the WAN, a private server 12 and associated database 16 and a public server 11 and associated database 15. The private server 12 can be any type of processing device or system, such as a network server, dedicated to gathering personal or other information that is publicly or privately available at sites connected to the WAN 10, such at from the public server 11 and database 15, and to store this information locally for later use or to immediately process the information as will be described later with reference to FIG. 4. The private server 12 can also host a web site that can be accessed via a public network, such as the internet, which web site may contain information about services available by subscription to the private server. The private server 12 can be accessed on a subscription basis and generally provides services to subscribers through interactive multimedia communication devices 20A and 20B which can be mobile or stationary. In the preferred embodiment of the invention, the interactive multimedia communication devices 20A and 20B are wired or wireless robotic devices that are capable of supporting an interactive multimedia communication session. Although a robotic device is employed in the preferred embodiment of the invention, the devices 20A and 20B can be any interactive multimedia communication device such as a mobile phone, a general purpose multimedia computational device or a multimedia toy device that takes almost any form such as a stuffed animal or a ball shaped object, mobile or stationary. The public server 11 and associated database 15 operate together to maintain a plurality of files or personal web pages each of which contains a wide variety of information relating or of interest to a particular individual. Each of the personal web pages contain information either manually generated or selected by an individual for inclusion on the web page or automatically selected by a web browser and downloaded to the database over WAN 10. The operation of the router 13 will not be described here in any detail as router functionality within the context of a WAN such as WAN 10 is generally well known to those skilled in the art of communications network design and operation and the method and apparatus of my invention does not depend on any particular router functionality. A detailed description of the private server 12 operation will be described later with reference to FIG. 4.

Continuing to refer to FIG. 1, two wireless access points or wireless routers 13A and 13B are shown connected to the WAN 10 over respective communication lines 11A and 11B and generally operate as the interface between the WAN 10 and the local devices which in this case are the robotic devices 20A and 20B and network communication devices 14A and 14B. The network communication devices 14A and 14B can be employed to access and/or edit information contained in the database 15, to access functionality and/or information provided by the private server 12 or to access functionality and/or information available at either of the two multimedia communication appliances 20A and 20B information More specifically, the wireless routers 13A and 13B receive packets of information formatted according to the Internet Protocol and convert them to packets of information formatted, in this case according to the well known IEEE 802.11 standard wireless transmission protocol, and transmit the converted packets over the wireless medium to the network communication devices 14A and 14B and to the robotic devices 20A and 20B. In the preferred embodiment of the invention, all of the routers are illustrated as being wireless, but it is not necessary for the network communication devices 14A or 14B to be wireless devices as they could also be wired to the routers 13A and 13B. Also, while it is possible that the robotic devices 20A and 20B are also in wired connection to the routers 13A and 13B, this is not a practical consideration as it is important that the robotic devices 20A and 20B be mobile within their environment.

Continuing to refer to FIG. 1 and as mentioned previously, the robotic devices 20A and 20B are shown in wireless communication with the routers 13A and 13B respectively. The robotic devices 20A and 20B can be any electro-mechanical type device with the capability to wirelessly connect to a router in order to communicate with other devices connected to the WAN 10. Each robotic device 20A and 20B is capable of physically moving within its environment, either autonomously or under remote control, it includes functionality that permits it to monitor and record audio and/or video information from its local environment, functionality that permits it to save and play mixed media content including textual information that it receives either over WAN 10 or from its local environment, and it includes functionality that allows it to operate on mixed media and textual information or other information it receives from its local environment or over WAN 10 to generate human perceptible reactions. I will now describe the capabilities of a robotic device in greater detail with reference to FIG. 2. Also, hereinafter, I will refer to a robotic device as simply a "robot".

Figure 2:
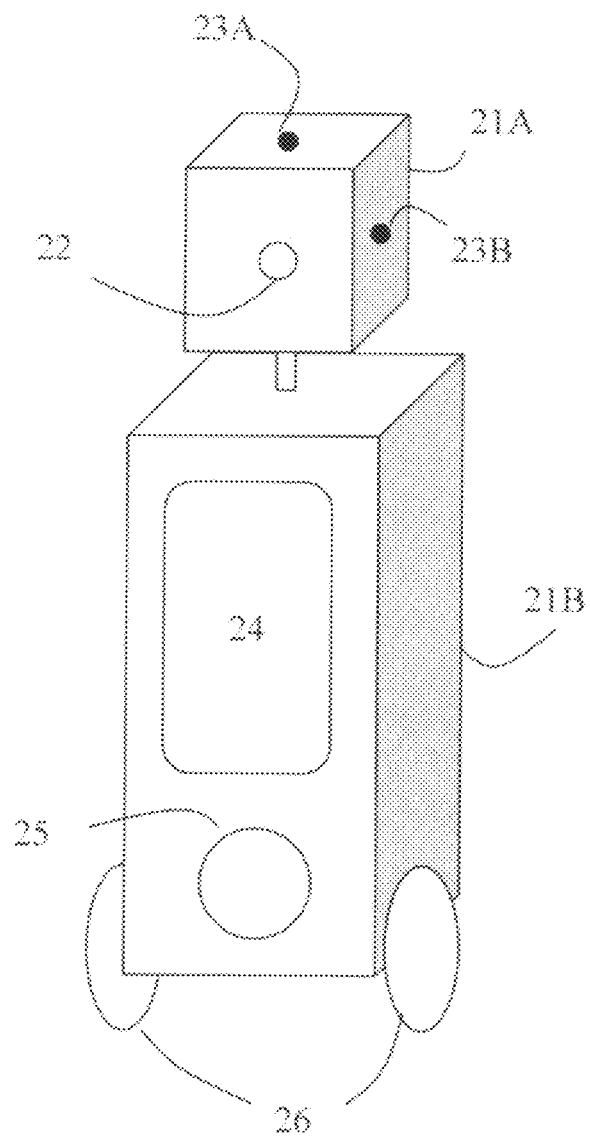
FIG. 2 is a perspective illustration of a representative robotic device.

FIG. 2 generally illustrates a robot 20, which is similar to the robotic devices 20A and 20B described earlier with reference to FIG. 1 that incorporates physical and mechanical characteristics included in the preferred embodiment of the invention. It should be understood that this illustration is only for the purpose of describing the functionality of a robot used to implement the method of the invention, and a robot used in conjunction with the invention need not be limited to this particular appearance or mechanical arrangement. Robot 20 includes an upper member 21A into which is incorporated at least one video camera 22 and one or more microphones 23A and 23B strategically placed to receive audio information generated in the environment surrounding the robot. The camera 22 operates to collect video information from the environment surrounding the robot and can be remotely controlled to pan and tilt. Alternatively, the camera 22 may only operate to tilt and the robot 20 can be controlled to move in such a way that the camera 22 effectively pans through a range of view. The particular mechanisms utilized to pan and tilt the camera and the particular technologies employed to implement the microphone system are well known to those skilled in the video and audio conferencing arts and not essential to the operation of the invention and so will not be described here in any detail. Robot 20 also includes a lower member 21b into which is incorporated a video display 24, at least one speaker 25 and a plurality of wheels 26. The rotation of each one of the wheels 26 can be separately and remotely controlled to cause the robot to move around in its environment. The video display 24 and the speaker 25 are employed to respectively play video and audio content either sent to the robot 20 from remote devices connected to the communications network, such as another robot or from the server 12 of FIG. 1 for instance, or gathered by the robot 20 from remote devices connected to the communications network. Although, for the purposes of this description, I have included robot capability as described above, my invention is not limited to a robot with only this set of capabilities, as other and more varied capabilities can be incorporated into a robot. For example, the robot can also include one or more lights of the same or different colors, the robot can include an IR transceiver and an RF transceiver none of which are shown in FIG. 2.

Figure 3:
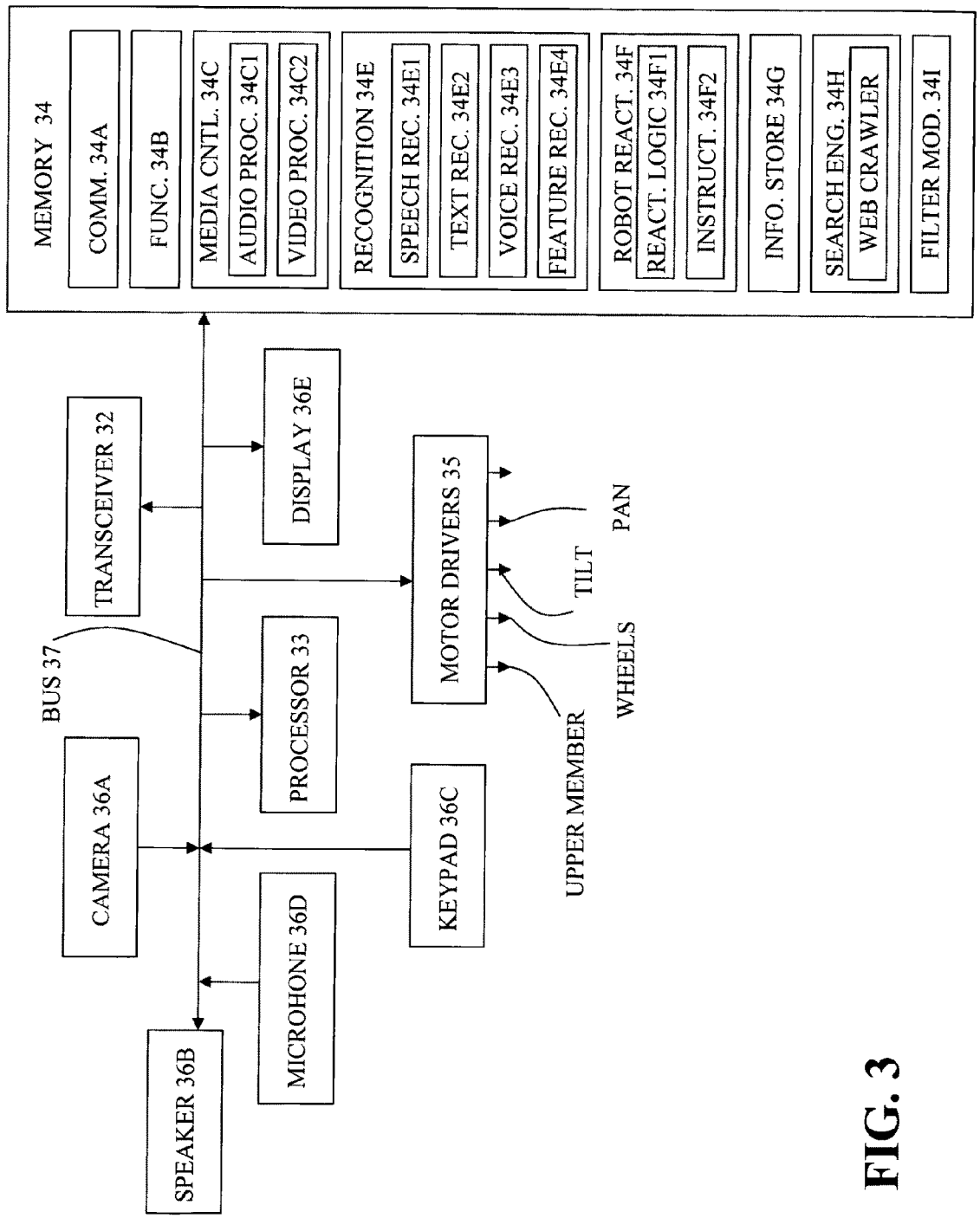
FIG. 3 is a functional block diagram of the robotic device.

FIG. 3 is a diagram showing the relationship between functional blocks necessary for the operation of the robot 20 of FIG. 2 according to one embodiment of the invention. A transceiver 32 functions as the physical interface to the wireless medium and receives messages from and sends messages to a wireless router, such as routers 13A or 13B for instance, and operates to convert the information contained in the wireless messages to information in a format that can be utilized by the processor 33. Processor 33 generally functions to process information and instructions received in messages from the other device connected to a bus 37 and to direct this processed information and instructions to certain robot functions, such as to the speaker 36B or video display 36E. The processor 33 can also send instructions to motor drivers 35 which causes one or more of the wheels 26 of FIG. 2 to rotate in a particular manner or to a robot upper member 21a to cause the camera 22 of FIG. 2 angle to pan or to tilt. The processor 33 of FIG. 3 may also receive messages from the transceiver 32, or any of the other robot functions, and store this information in memory 34 for later use. Further, the processor 33 can also receive audio information from a microphone 36D or video from a camera 36A.

Continuing to refer to FIG. 3, as described above, the memory 34 is employed to store information sent to or gathered by the robots 20A or 20B from remote locations on the WAN 10 of FIG. 1 or from its local environment. In the preferred embodiment of the invention, memory 34 includes a communication module 34A, that can among other things operate according to the IEEE 802.11 standard. Further, the communication module 34A operates at the medium access control level to among other things establish, maintain and terminate communication sessions with other wireless devices within range, such as an access point or other robots. Memory 34 can also include a plurality of general operational software modules 34B that function to perform such operations as encrypting and decrypting packets of information that are transmitted or received over the WAN 10, operating system code, supplying drive signals to the wheels, format audio and video information received from the microphone and camera for storage in the memory 34 or for processing by the processor 33. Memory 34 is also used to store a media control module 34C which operates to directed multimedia content to and from as needed to either of an audio processing module 34C1 or video processing module 34C2. The audio processing module 34C1 operates on audio content received over the network 10A or from microphone 36D for instance. Audio module 34C1 can include, among other things, signal processing, sound vector, speech processing and codec functionality that are all well known to those familiar with the audio processing technology and so will not be described in any detail here. The video processing module 34C2 operates on video content received over the network 10A or from the video camera 36A for instance and can include among other things video pre-processing and codec functionality.

Referring again to FIG. 3, memory 34 can include a search engine 34H with an associated web-crawler functionality. In the preferred embodiment the web-crawler functionality is included without the search engine 34H. The search engine 34H can be any commercially available search engine such as the popular "Google" engine for instance. A web crawler is an information retrieval system designed to help find information stored on a computer system located in a network such as WAN 10. The web crawling module can directly harvest information which includes some or all of personal information that is stored in a personal web page 53 located in the database 15 of FIG. 1, described later with reference to FIG. 5A and FIG. 5B. This harvested personal information is then run through a text recognition sub-module 34E2 or a speech recognition sub-module 34E1 which will be described in more detail below and where particular words or phrases of interest are detected. The particular words or phrases detected by the recognition module can then be stored temporarily in information store 34G and can be filtered by a filter module 34I, also stored in memory 34, which in this case examines the detected words or phrases for "new" personal information. New in this context can mean any personal information that has been added or that has been changed in the last twenty four hours for example. The words and/or phrases that pass through the filter module 34I can then be stored in the information store 34G. In this case, information store 34G can be divided into a plurality of separate files at least one of which contains personal information about the individual using the robot but can include separate files containing information about individuals included in a listing of friends which is referred to here as a "buddy list". As will be described later, a reaction module 34F can be employed to operate on information stored in the information store 34G to determine which of a plurality of reaction instructions are selected in order for a robot to convey the state of an individual by generating a human perceivable reaction. The result of the selection process can be a list of "pointers" to the locations in instruction logic listing 34F2 where the reaction instructions are stored. The processor 33 can, upon manual command or automatically according to a pre-selected schedule or trigger event, examine the instruction logic listing 34F2 for these pointers and then pass the information contained in the reaction instructions to the corresponding robot functionality, which could be the speaker 36B, the display 36E or any of the motor drivers 35 for instance.

With continued reference to FIG. 3, memory 34 can also be used to store a recognition module 34E that includes four sub-modules 34E1-34E4. Generally, the recognition module 34E operates to identify content of interest contained in the information store 34G or in the robots 20a or 20b environment. Sub-module 34E1 generally operates on speech information stored in memory 34 or speech information received by one of its microphones from the environment to recognize and convert to textual information a series of utterances. Sub-module 34E1 is typically configured to recognize a large set of words, which can include a preponderance of the words in a particular lexicon, or sub-module 34E1 can be configured by a robot user to only recognize a particular sub-set of interest of all the words in a lexicon. This speech information can be either uncompressed or compressed audio information and may be operated on as soon as it is received by robot 20 or can be stored in memory 34 and operated on at some later time depending upon whether or not certain conditions are met, such as a "trigger" event occurring. Such a "trigger" event can be a scheduled calendar event, a "Buddy" logging in on a remote robot or a robot recognizing an individual. Sub-module 34E2 operates on textual information that the robot 20 receives over WAN 10 or from a local source such as an individual operating a network communications device 14a or possibly a scanning device located on the robot 20. Sub-module 34E2 can be any optical character recognition application that examines the textual information in order to detect certain words, phrases or topics that the robot user pre-determines to be of interest. As with the speech information, the textual information can be immediately operated on by sub-module 34E2 or it can be stored in memory 34 for use later. Sub-module 34E3 operates on speech information to recognize an individual's voice by extracting features from speech, modeling the speech features and using this to recognize an individual from their voice. As with the speech recognition functionality, the voice or speaker recognition functionality is typically "trained" to discriminate between one or more individuals voices. Sub-module 34E4 can recognize an individual based on biometric information about the individuals facial features. Detail about the operation of the above four recognition sub-modules 34E1-34E4 will not be undertaken here as the functionality provided by these sub-modules is commercially available and generally well understood by practitioners in the field. Although the preferred embodiment is described as including only four recognition sub-modules, it can include other sub-modules that provide additional functionality such as the previously mentioned scanner.

Continuing to refer to FIG. 3, a robot reaction module 34F operates in conjunction with processor 33 to utilize the results of the recognition sub-modules 34E1, 34E2, 34E3 and 34E4 to convey the mental, emotional, wellness, physical or any other state of an individual by generating a human perceivable reaction in the robot. So for example, if the combined operation of the text recognition module 34E2 and the robot reaction module 34F on personal information stored in memory 34 determines that an individual is unhappy, the robot reaction module 34F can send instructions to either a local robot such that the robot can convey sympathy to an individual by generating a sympathetic human perceivable reaction that can be an utterance like "I am sorry to see that you are sad", or the instructions can be sent to a remote robot to convey that an individual is sad. In one embodiment of the invention, the four recognition sub-modules 34E1-34E4 are employed to operate on information that is gathered by the robot from its local environment and in another embodiment of the invention the four recognition sub-modules 34E1-34E4 are employed to operate on information received from remote locations over the WAN 10. Referring to the robot reaction module 34F in more detail, the reaction module includes two sub-modules, robot reaction logic 34F1 and robot reaction instructions 34F2. The processor 33 employs the reaction logic 34F1 to operate on information gathered from the environment local to the robot or to operate on information gathered from remote locations over WAN 10 and stored in information store 34G, which is described below also with reference to FIG. 3. As the result of the reaction logic 34F1 operation, a determination is made regarding what type of reaction instruction 34F2 the server will send to a robot. An example of robot reaction logic 34F1 in pseudo-code form that can be used by the processor to operate on information stored in information store 34G is illustrated and described later with reference to Table 1, and an exemplary set of robot reaction instructions 34F2 is shown and described with reference to Table 2. The information store 34G mentioned above can include the information generated and stored as the result of the recognition modules 34E1-34E4 processing information received by the robot from either its local environment or from remote sites over the WAN 10. Information in store 34G can include residential security information, individual presence information, temperature information, news information, personal information, financial information or any type of information that can be sensed by the robot in its local environment or gathered by the robot from remote locations connected to WAN 10.

Although the embodiment of the robot 20 described above with reference to FIG. 3 includes functionality that enables the robot 20 to autonomously or under manual guidance gather information from remote sites connected to the WAN 10 and to process this information in various ways to generate a human perceivable reaction, in the preferred embodiment of the invention, the robot is only capable of receiving information and instructions that are generated and transmitted to the robot 20 by server 12. Receipt of this information and instructions can result in the robot 20 generating some type of response that can be perceived by an individual, whether the individual is proximate to the robot 20 or located remote from the robot 20. The response generated by the robot 20 can be immediate or generated after some period off time depending upon the presence of a trigger event, such as when an individual the robot 20 recognizes enters the same room as the robot 20. In the preferred embodiment of the invention, the robot 20 serves as an intermediary between information that is processed and interpreted at the server 12 and a community of friends. In other words, the robot 20 is effectively able to "share" information of all types within a group of friends. This information can be general information such as local or international news events or it can be personal information about the individual who is responsible for operating the robot 20. Moreover, the robot can share this information with friends in a way that promotes the establishment of close, friendly relationships between individuals.

Figure 4:
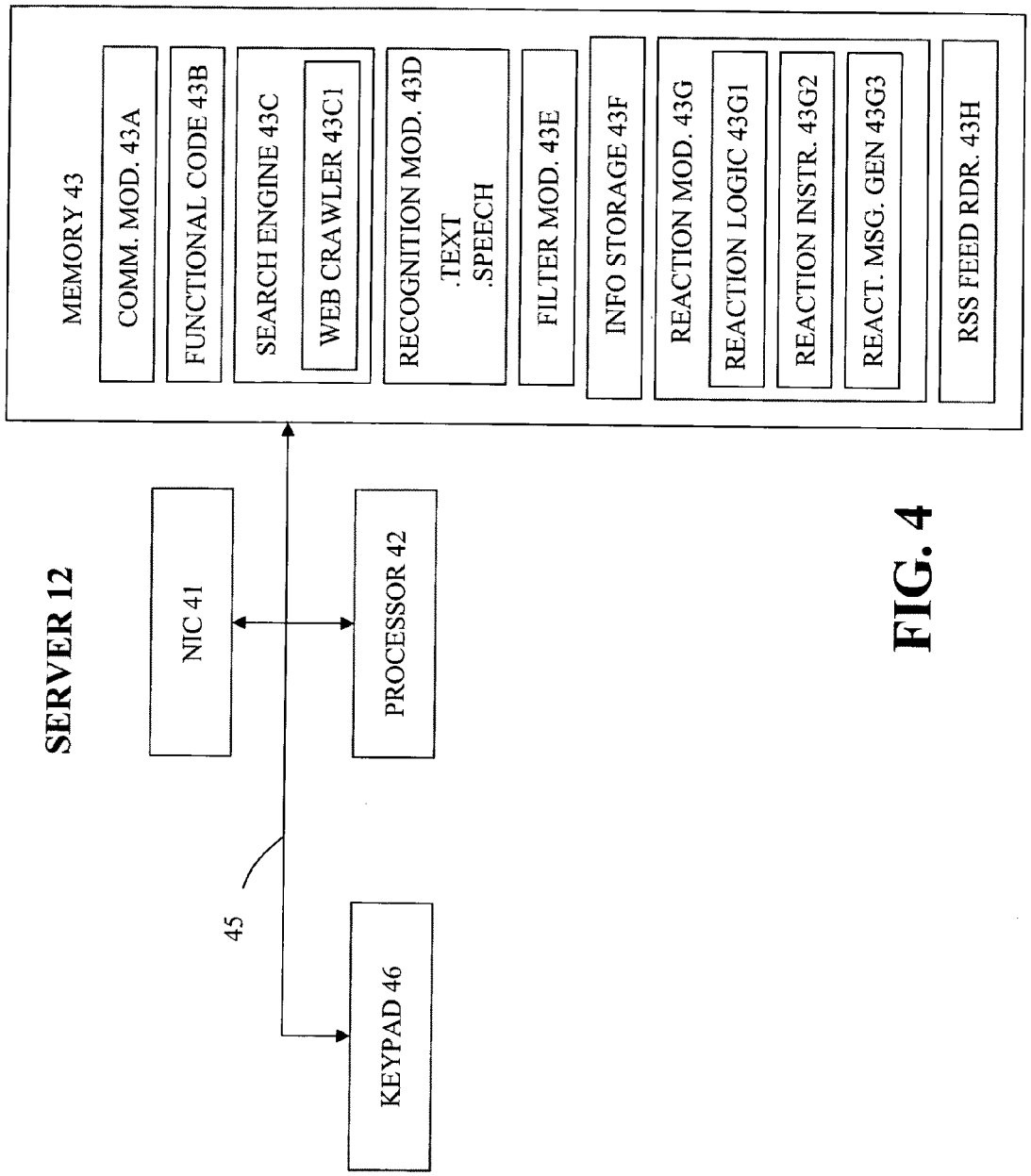
FIG. 4 is a diagram showing the functional elements of a private server.

Turning now to FIG. 4 which is a block diagram of a server such as the private server 12 in FIG. 1. Private server 12 can be any type of computational device suitable for processing large amounts of information very efficiently. In general, the private server 12 functions to gather information from personal web pages residing on the database 15 over the WAN 10 and can temporarily store this information in memory 43 for later processing or process the information immediately depending upon the existence of certain "trigger" events in either the robots 20 local environment or outside the robots 20 local environment. The private server 12 includes a network interface card (NIC) 41 that operates as the signal interface between the server 12 and the WAN 10. Generally, the NIC 41 operates to receive packets of information routed to the private server 12 that are formatted according to the well known Internet protocol and convert them to signals suitable for use by a processor 42, memory 43 all interconnected over bus 45. The NIC 41 also operates to convert signals generated by the server for transmission over the WAN 10 and converts them to the Internet protocol. The processor 42 can generally operate in response to signals it detects on a system bus 41A and in conjunction with software stored in memory 43 to generate messages for transmission to the database 15, or to process information received from the database 15 and to store the processed information in memory 43 for later use or for immediate use or to generate messages for transmission to a robot, which can be robot 20A for example.

Continuing to refer to FIG. 4, memory 43 can include software modules that implement a particular communication protocol, that implement an operating system, or that gather, recognize and filter personal information from the database 15, or that include logic used to determine what type of reaction a robot should exhibit. A communication module 43A among other things implements functionality that generally controls the private servers 12 access to the wired medium in a manner that prevents collisions with traffic on the WAN 10. It also operates to initiate, maintain and end communication sessions, over WAN 10, with remote locations such as a robot 20A, the database 15 or with a network communication device 14A. A functional code module 43B implements such things as encryption and decryption of packets or other security features and it will typically include operational system code that the processor uses to operate the private server 12. A search engine 43C can be any commercially available search engine such as the popular "Google" engine for instance. A search engine is an information retrieval system designed to help find information stored on a computer system located in a network such as WAN 10. The search engine 43C can employ a web crawling module 43C1 to harvest personal information included in a personal web page that is stored in the database 15 which is described in detail later with reference to FIG. 5A. In one embodiment, the web crawling module 43C1 operates independently from the search engine 43C. The server 12 can also receive information from an RSS feed reader 43H included in server 12. RSS stands for really simple syndication and there are services that and individual can subscribe to in order to periodically receive information that is published over the Internet, which in this case is equivalent to the WAN 10. This harvested personal information gathered by the web crawler 43C1 can be temporarily stored in memory 43 in an information store 43F and then periodically run through a text or speech recognition module 43D where particular words or phrases of interest are detected. The particular words or phrases of interest detected by the recognition module 43D are then filtered by a filter module 43E which in this case examines the detected words or phrases for "new" personal information. New in this context can mean any personal information that has been added or that has been changed in the last twenty four hours for example. The words and/or phrases that pass through the filter module 43E are then stored in information store 43F in memory 43.

Continuing to refer to FIG. 4, memory 43 also includes a robot reaction module 43G which includes a reaction logic sub-module 43G1 and robot reaction instructions 43G2. The processor 42 employs the reaction logic 43G1 to operate on the filtered personal information stored in information store 43F to determine what type of reaction instruction 43G2 the server will send to a robot. An example of robot reaction logic 43G1 in pseudo-code form that can be used by the processor to operate on this personal information is illustrated with reference to Table 1 below.

TABLE 1

Fetch latest home teams score:
  (1) If home team wins game;
      call reaction instruction "home team wins game"

TABLE 1-continued

```
(2) If home team looses game
        call reaction instruction "home team looses game"
    Fetch parent status
(3) If master's parent dies
        call reaction instruction "parent dies"
(4) If master receives raise at work
        call reaction instruction "received raise"
```

The reaction logic 43G1 illustrated above with reference to Table 1 is in the form of multiple "if" statements (1), (2), (3) and (4). "If" statement (1) is evaluated by processor 42 against filtered information retrieved from one the information store 43F stored in memory 43. In this case the filtered information retrieved relates to the box score of the latest home teams game, which could be the last game within a twenty four hour period for instance. In this case, the logic of "if" statement (1) dictates that if the home team wins, the processor goes to a location in memory 43 where the reaction instruction logic "home team wins game" is stored. The remainder of the "if" statements (2), (3) and (4) are processed in the same manner. Reaction instructions 43G2 referred to above with reference to Table 1 are illustrated in detail with reference to Table 2 below.

TABLE 2

```
List [4] Reaction Instructions
(1) "home team wins game"
        send message to robot causing it to utter
        "home team won" and play "Hallelujah Chorus"
        and move quickly around in circle
(2) "home team looses game"
        send message to robot causing it to utter
        "home team lost" and play "death march" and move
        slowly around in circle
(3) "parent dies"
        Send message to robot causing it to commiserate
        master
(4) "received raise"
        Send message to robot causing it to utter
        "I got a raise" and play favorite song.
```

As the result of the processor 42 accessing those locations in memory 43 where any one of the above four reaction instructions 43G2 are stored, the server 12 can generate a message, using the reaction message generation module 43G3, that includes reaction instruction information which can be reaction instruction (1) for instance and send the message to a robot, which can be robot 20A in FIG. 1 for instance. The server can control the sending of such reaction messages or a robot can request that one or more recent reaction messages be sent to it. When robot 20A receives the message, it will operate on the reaction instructions contained in the message to generate a human perceivable reaction, which in this case is uttering "home team won", playing the hallelujah chorus and quickly moving about its environment in a circle. Further, robot 20A can establish a communication session with another robot, robot 20B and "share" the "home team won" reaction with robot 20B by sending a message that includes the reaction instruction (1). As a result of this "sharing" of information, robot 20B is able to convey the "home team won" information to the individual responsible for operating robot 20B. Although not described above with respect to the preferred embodiment of the invention, the robots reactions are not limited to only playing multimedia content and moving around in a particular way. In the event that the robot 20A includes arms or facial features, it might react with some facial expression or react by moving its arms in a particular way.

Figure 5A:
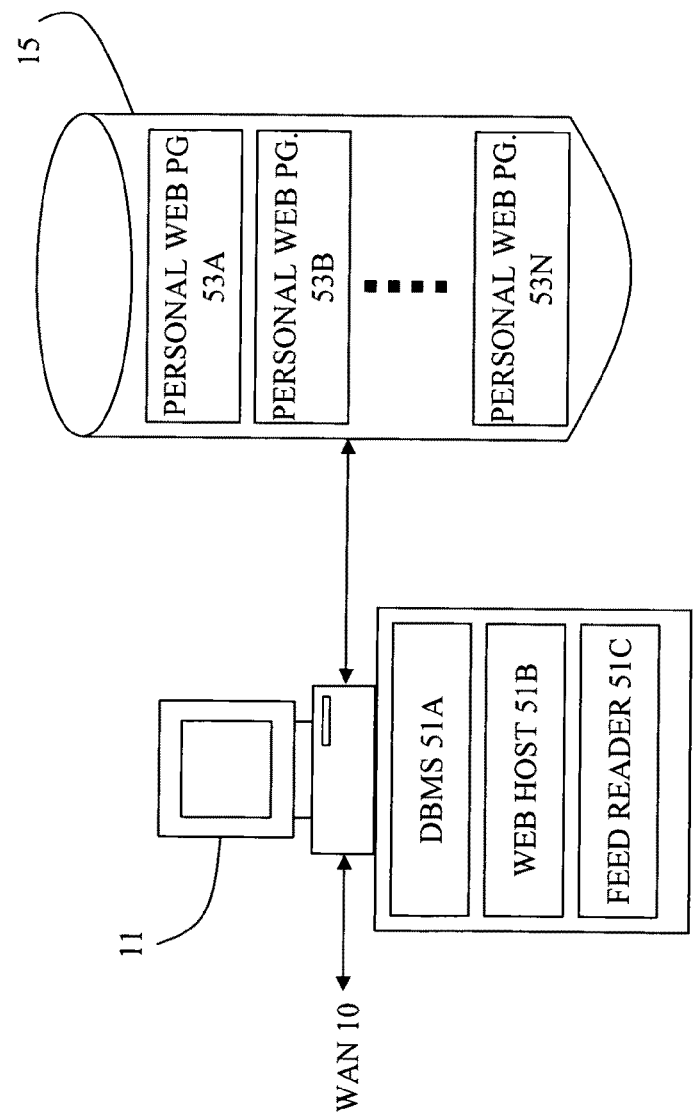
FIG. 5A is a diagram showing a public network server and associated database.

FIG. 5A is a high level block diagram showing the functionality needed for the operation of the database 15 of FIG. 1. Shown in FIG. 5A is the database server 11 of FIG. 1 that includes a database management software (DBMS) module 51A, a web hosting module 51B and optionally a feed reader 51C. The DBMS module 51A can be any type of database management system suitable for managing the personal web page files. The web hosting module 51B is an application used by the database server 11 to provide the web hosting service to individuals and its primary function is to provide an application program interface (API) for individuals who have personal web pages on the database. This API allows individuals to access their personal web pages to edit the personal information stored at their web site. The web hosting module 51B can also receive information from a feed reader 51C also included in database server 11. RSS stands for really simple syndication and there are services that and individual can subscribe to in order to periodically receive information that is published over the Internet, which in this case is equivalent to the WAN 10. A mass storage device 52 associated with the database server 11 is used by the database 15 to store a plurality of personal files 53a-53n each of which contains personal information, both public and private, about individuals who have subscribed to the personal web page service. Access from outside the database to all of the information that is stored in each of the personal files is managed by the DBMS module 51A that as previously described resides in database server 11.

FIG. 5B is an illustration of the contents 54 of the personal web page file 53A that is stored on the database 15 and explained in detail above with reference to FIG. 5A. The listing of the personal web page information is not intended to be an exhaustive list as other personal or general information can be elected to be stored here by the individual in control of the content. File 53A includes a picture 54A of the individual about which the web page relates to, the name 54B of the individual, the age 54C of the individual, the sex of the individual 54D, the individuals height and weight 54E, occupation 54F, marital status 54G and the individuals preferences 54H. The preferences 54H can include such subjects as the individuals relationship objectives 54H1, likes and dislikes 54H2, favorite sports teams 54H3, favorite music 54H4, favorite activities 54H5, status of family life such as the health of family members for instance and the status of private life such as the state of private relationships or any other subject that the individual in control of the web pages content wishes to include.

Figure 6:
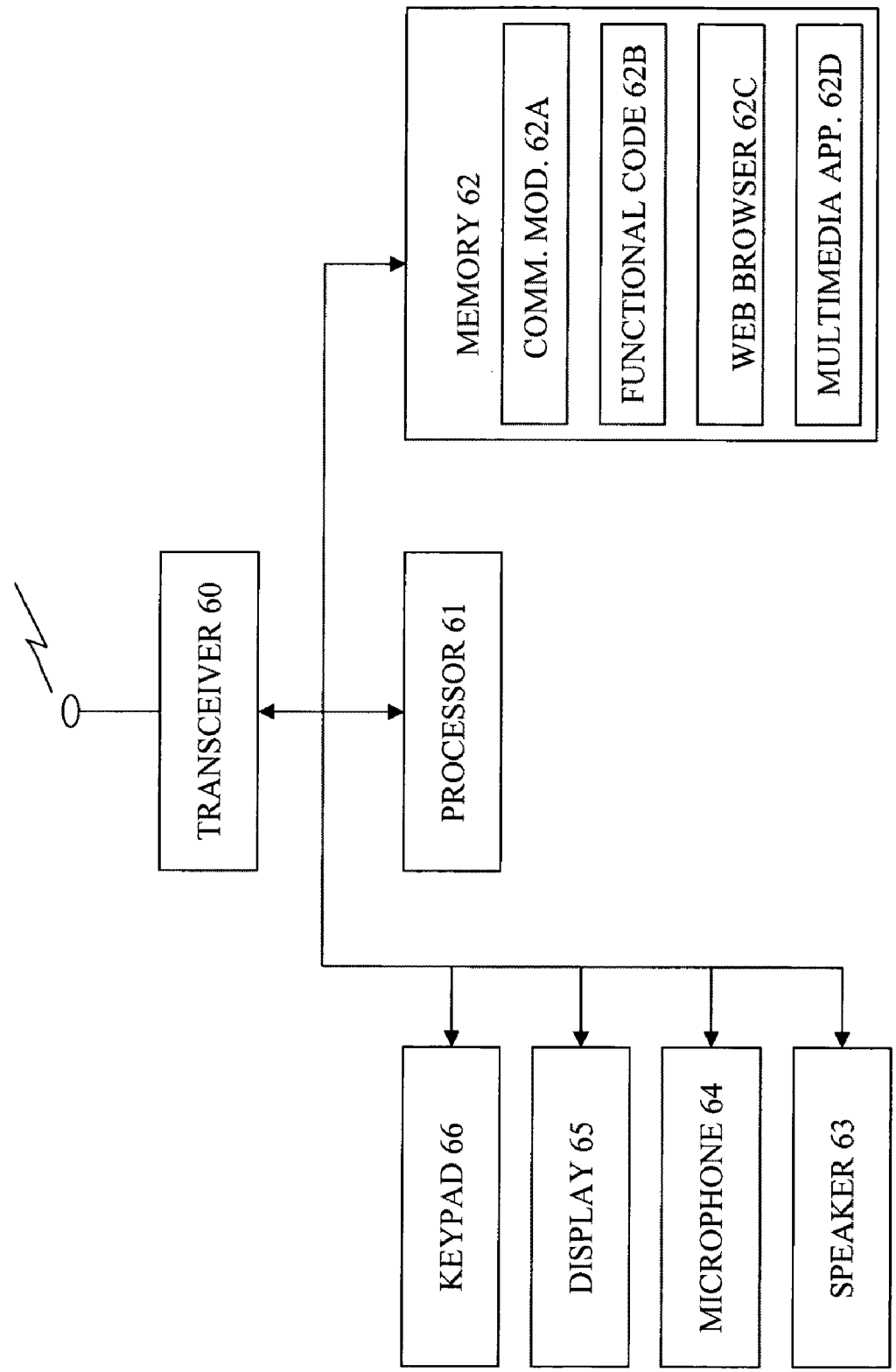
FIG. 6 is a functional block diagram of an electronic device employed to communicate with both the private server and the robotic device.

FIG. 6 is a diagram showing the relationship between functional blocks that are necessary to operate the network communication devices 14a and 14b of FIG. 1. For the purpose of the FIG. 6 description, the devices 14a and 14b will be collectively referred to as network communication device 14. The network communication device is capable of recording and playing multimedia content and although the network communication device 14 is described in the context of a wireless device, it can just as easily be a wired device. The network communication device 14 includes a transceiver 60 that functions as the physical interface between the communication device 14 and the wireless medium, which in the preferred embodiment of the invention operates according to the IEEE 802.11 specification. The network communication device 14 operates to receive packets of information from an access point, such as access point 14a, over the wireless medium and convert them to packets of information that are useful to a processor 61 and vice versa. The processor 61 generally functions in conjunction with memory 62 to operate on the packets of information received over the wireless medium or to generate packets of information that are sent to a remote site over WAN 10. The result of such processor operations can be that information is stored in memory 62 or played on a display 63 and speaker 64 for instance or the result can be sending a message to the database 15 requesting information from a personal web site or a message that includes information to edit or add information to the personal web site or a message to a robot 20a or 20b either requesting information from the robot or sending information to the robot, such as personal or general information.

Continuing to refer to FIG. 6, memory 62 can include software modules that, as mentioned previously, can be used to facilitate communications with the database 15 to edit information stored on an individual's personal web page, to view information stored on another individual's personal web page, or to send instructions to a robot 20 for instance. Memory 62 can include a communications module 62A that operates to, among other things, establish, maintain and end communication sessions with remote devices attached to the WAN 10. Memory 62 can also include a functional code module 62B that includes, among other things, operation system functionality and it can included a web browser 62C that is employed to generally search for various types of information available over the WAN 10 or to go to a web site to access a particular personal web page in order to edit or view information. Memory 62 also can include a multimedia application 62D that can be employed to record or play multimedia content.

The method that is employed by the invention to gather and process personal information which results in instructions that a robot can use to convey the state of an individual by generating a human perceivable reaction will now be described with reference to FIGS. 7A and 7B. The method of the invention is described in the context of two embodiments. In the preferred embodiment, all of the gathering and processing of personal information takes place at a private server, such as the server 12 in FIG. 1. However, in another embodiment, a robot includes all of the functionality needed to gather and process personal information which results in instructions the robot can use to generate a human perceivable reaction. Regardless, it should be assumed that the method, illustrated and described with reference to steps 1 to 7 in FIGS. 7A and 7B can be performed by either a robot or a private server. In step 1 of FIG. 7A a web crawler, such as the crawler associated with the search engine 34H of FIG. 3, is employed to gather particular types of information from web sites located on the WAN 10. The information gathered can be of a general type, such as world or local news, or it can be of a personal type, such as personal information stored in the database 15 associated with the private server 11 of FIG. 1 and all of this information is gathered from locations connected to the WAN 10. More specifically, the web crawler can examine all of the files stored in database 15 to detect information associated with a particular personal web page, web page 53A of FIG. 5A for instance. The web crawler can then cause this personal information to be down loaded, to either the private server 12 or the robot 20B of FIG. 1 for instance, and then stored. For the purpose of this description, the personal information down loaded and stored can be textual information. In step 2, a text recognition module located at either a robot or a private server can then operate on the textual personal information stored in step 1 to identify words or phrases that can be used by a robot to generate one or more human perceivable reactions. The results of the text recognition module operating on the stored personal information are then stored in memory. In step 3 of the process, a filter can operate on the words or phrases stored in step 2 to determine whether or not the words or phrases are "new" information and in step 4, if any words or phrases are found to be "new", then the process proceeds to step 5 where the results of the filter operation are stored, otherwise the process returns to step 2.

Figure 7A:
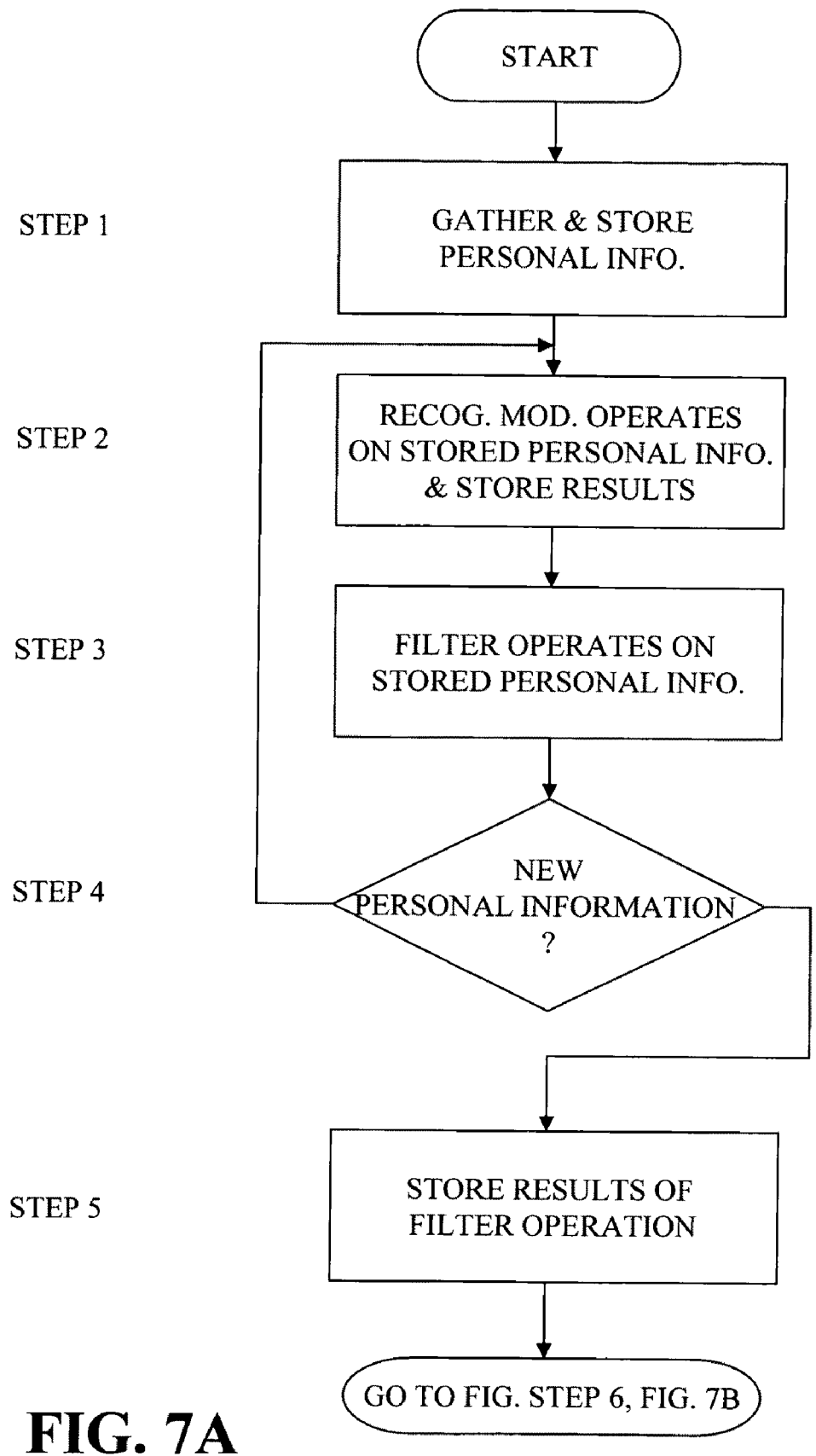
FIG. 7A is a logical flow diagram of the method of the invention.
Figure 7B:
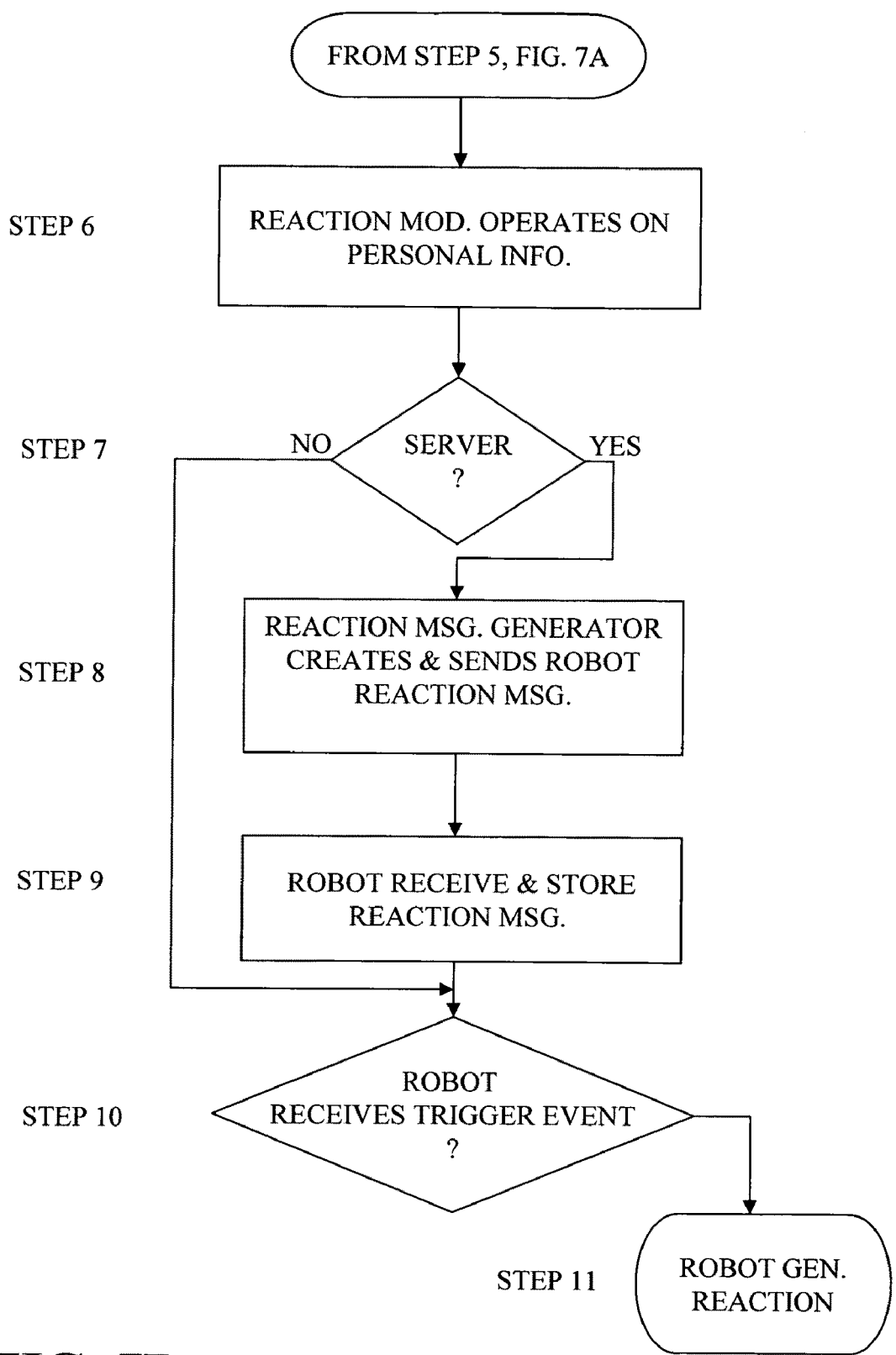
FIG. 7B is a continuation of the logical flow diagram of FIG. 7A.

Referring now to FIG. 7B, in step 6 the information determined to be "new" and stored in step 5 of FIG. 7A can be operated on by logic 43G1 associated with a reaction module, such as reaction module 43G in FIG. 4. As the result of the "new" personal information being processed by the reaction logic, a pointer to a reaction instruction is identified, such as the reaction instruction (1) referred to in Table 1 and listed in Table 2. If, in step 7, the reaction logic and instruction logic resides in a private server, the process proceeds to step 8 where a reaction message generator, such as the message generator 43G3 of FIG. 4, creates and sends a message to a robot, robot 20B for instance, that includes the reaction instruction identified in step 6. On the other hand, if in step 7, the reaction and instruction logic reside in a robot, then the process proceeds directly to step 10. Continuing to refer to step 8, the reaction message generator sends the message over the WAN 10 to a robot, robot 20B for instance, and in step 9 the robot receives and temporarily stores the reaction message. If in step 10 the robot receives a "trigger" event, then it processes the reaction instructions contained in the reaction message in order to generate a human perceivable reaction. If, on the other hand, a "trigger" event is not received, then the process just loops on step 10 until a "trigger" event is received. If in step 7 the reaction and instruction logic reside in the robot, then the process proceeds directly to step 10 and the process proceeds as described above.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for conveying an emotional or physical state of a first individual to at least one other individual through an interactive, multimedia robotic device connected to a communications network comprising:

a processing device connected to the network identifying and storing information relating to the state of the first individual that is available on the network;

the processing device interpreting the stored state information relating to the first individual to identify at least one robotic device reaction instruction stored on the processing device;

the processing device transmitting the at least one robotic device reaction instruction to the interactive, multimedia robotic device; and the interactive, multimedia robotic device receiving the at least one robotic device reaction instruction and using it to execute one or more human perceivable actions that conveys the emotional or physical state of the first individual to at least one other individual proximate to the robotic device, wherein the human perceivable actions include the robotic device playing audio, video and robotic device movement that corresponds to the emotional or physical state of the first individual.

2. The method of claim 1 wherein the interactive, multimedia robotic device is one of a mobile robotic device, a mobile phone, a general purpose multimedia computational device, and a multimedia toy.

3. The method of claim 1 wherein the information relating to the first individual is comprised of at least one of the first individuals name, age, picture, gender, height, weight, occupation, marital status and the first individuals preferences.

4. The method of claim 3 wherein the first individuals preferences are comprised of one or more of relationship objective, likes, dislikes, favorite sports team, favorite music, favorite activity, family life status and private life status.

5. The method of claim 1 wherein the step of interpreting the received and stored information comprises:

identifying content of interest contained in the received and stored information;

filtering the content of interest to identify new content and storing the new content;

employing the new content to identify a robotic device reaction instruction; and creating a robotic device reaction instruction message.

6. The method of claim 1 wherein the communications network is one of a public and a private network.

7. The method of claim 1 wherein the at least one robotic device reaction instruction is an electronic message that can be employed by the interactive, multimedia robotic device to generate a human perceivable action.

8. The method of claim 1 wherein the human perceivable action performed by the interactive, multimedia robotic device conveys the state of the first individual to the at least one other individual.

9. A method for conveying an emotional or physical state of a first individual to at least one other individual through an interactive, multimedia robotic device connected to a communications network comprising:

receiving and storing at the interactive, multimedia robotic device information relating to the emotional or physical state of the first individual;

the interactive, multimedia robotic device interpreting the received information relating to the first individual to identify at least one robotic device reaction instruction stored on the robotic device; and the interactive, multimedia robotic device using the at least one identified robotic device reaction instruction to execute one or more human perceivable actions that convey the emotional or physical state of the first individual to the other individual proximate to the robotic device, wherein the human perceivable actions include the robotic device playing audio, video and robotic device movement corresponding to the emotional or physical state of the first individual.

10. The method of claim 9 wherein the interactive, multimedia robotic device is one of a mobile robotic device, a mobile phone, a general purpose multimedia computational device, and a multimedia toy.

11. The method of claim 9 wherein the information relating to a first individual is received over one of a communications network and the environment proximate to interactive, multimedia robotic device.

12. The method of claim 9 wherein the information relating to the first individual is comprised of at least one of the first individuals name, age, picture, sex, height, weight, occupation, marital status and the first individuals preferences.

13. The method of claim 11 wherein the first individuals preferences are comprised of one or more of relationship objective, likes, dislikes, favorite sports team, favorite music, favorite activity, family life status and private life status.

14. The method of claim 9 wherein the step of interpreting the received and stored information comprises:

identifying content of interest contained in the received and stored information;

filtering the content of interest to identify new content and storing the new content;

employing the new content to identify a reaction instruction; and creating a robotic device reaction instruction message.

15. The method of claim 9 wherein the communications network is one of a public and a private network.

16. The method of claim 9 wherein the at least one robotic device reaction instruction is an electronic message that can be executed by the interactive multimedia communications device to convey a human perceivable action.

17. The method of claim 9 wherein the human perceivable action executed by the interactive, multimedia robotic device conveys the state of the first individual to the at least one other individual.

18. A system for conveying an emotional or physical state of a first individual to at least one other individual through an interactive, multimedia robotic device comprising;

a public server connected to a communications network;

an interactive, multimedia robotic device connected to the communications network, and a private server connected to the communications network comprising:

a web crawler for gathering information relating to the first individual;

a recognition module for identifying content of interest contained in the information gathered by the web crawler;

a filter module for identifying new content of interest;

a reaction module for identifying at least one robotic device reaction instruction and for generating a reaction instruction message; and a communications module for sending the at least one robotic device reaction instruction message to the interactive, multimedia robotic device which uses the instruction to execute one or more human perceivable actions that conveys the emotional or physical state of the first individual to the other individual, who is proximate to the robotic device, wherein the human perceivable actions include the robotic device playing audio, video and robotic device movement corresponding to the emotional or physical state of the first individual.

19. The system of claim 18 wherein the interactive, multimedia robotic device is one of a mobile robotic device, a mobile phone, a general purpose multimedia computational device and a multimedia toy.

20. The system of claim 18 wherein the information relating to the first individual is comprised of at least one of the first individuals name, age, picture, sex, height, weight, occupation, marital status and the first individuals preferences.

21. The system of claim 20 wherein the first individuals preferences are comprised of one or more of relationship objective, likes, dislikes, favorite sports team, favorite music, favorite activity, family life status and private life status.

22. The system of claim 18 wherein the communications network is one of a public and a private network.

23. The system of claim 18 wherein the at least one robotic device reaction instruction is an electronic message that can be employed by the interactive, multimedia robotic device to execute a human perceivable action.

24. The system of claim 18 wherein the human perceivable action executed by the interactive, multimedia robotic device conveys the emotional or physical state of the first individual to the at least one other individual proximate to the robotic device.

* * * * *